(12) United States Patent
Melville

(10) Patent No.: US 7,278,233 B2
(45) Date of Patent: Oct. 9, 2007

(54) DUAL FISHING ROD HOLDER

(76) Inventor: Robert T. Melville, 34511 Calle Monte, Capistrano Beach, CA (US) 92624

( * ) Notice: Subject to any disclaimer, the term of this patent is extended or adjusted under 35 U.S.C. 154(b) by 0 days.

(21) Appl. No.: 10/666,859

(22) Filed: Sep. 18, 2003

(65) Prior Publication Data

US 2005/0076556 A1   Apr. 14, 2005

(51) Int. Cl.
*A01K 97/10* (2006.01)
(52) U.S. Cl. .................. 43/21.2; 248/512; 248/520
(58) Field of Classification Search ............. 43/21.2; 244/70.8; 248/512, 513, 520
See application file for complete search history.

(56) References Cited

U.S. PATENT DOCUMENTS

| | | | | |
|---|---|---|---|---|
| 2,499,117 A * | 2/1950 | Smith | ................ | 224/259 |
| 3,802,112 A * | 4/1974 | Banner | ................ | 43/21.2 |
| 4,157,803 A * | 6/1979 | Mack | ................ | 248/512 |
| 4,248,002 A * | 2/1981 | McNellis | ................ | 43/27.4 |
| 4,388,774 A * | 6/1983 | Thoemke | ................ | 43/21.2 |
| 4,485,579 A * | 12/1984 | Hawie | ................ | 43/21.2 |
| 4,527,349 A * | 7/1985 | Emory, Jr. | ................ | 43/21.2 |
| 4,650,146 A * | 3/1987 | Duke | ................ | 248/512 |
| 4,793,086 A * | 12/1988 | Cup | ................ | 43/21.2 |
| 4,823,723 A * | 4/1989 | Brooks | ................ | 114/343 |
| 4,828,152 A * | 5/1989 | Pepping | ................ | 224/200 |
| 4,836,127 A * | 6/1989 | Wille | ................ | 114/343 |
| 4,869,195 A * | 9/1989 | Eichfeld | ................ | 114/364 |
| 4,876,980 A * | 10/1989 | Bell, III | ................ | 114/364 |
| 4,901,469 A * | 2/1990 | Murray | ................ | 43/21.2 |
| 4,916,847 A * | 4/1990 | Rusgo | ................ | 43/19.2 |
| 4,964,233 A * | 10/1990 | Benson et al. | ................ | 43/17 |
| 5,301,451 A * | 4/1994 | VanAssche | ................ | 43/27.4 |
| 5,435,093 A * | 7/1995 | Minorics et al. | ................ | 43/19.2 |
| 5,438,789 A * | 8/1995 | Emory | ................ | 43/21.2 |
| 5,461,817 A * | 10/1995 | Flood | ................ | 43/19.2 |
| 5,542,205 A * | 8/1996 | Updike | ................ | 43/15 |
| 5,662,251 A * | 9/1997 | Rossiter | ................ | 224/200 |
| 5,673,507 A * | 10/1997 | Stokes, Jr. | ................ | 43/21.2 |
| 5,778,592 A * | 7/1998 | Malmberg | ................ | 43/21.2 |
| 5,987,803 A * | 11/1999 | White | ................ | 43/21.2 |
| 6,052,937 A * | 4/2000 | Morong | ................ | 43/21.2 |
| 6,289,627 B1 * | 9/2001 | Gibbs et al. | ................ | 43/21.2 |
| 6,446,379 B1 * | 9/2002 | James | ................ | 43/17 |
| 6,490,823 B1 * | 12/2002 | Ibarra | ................ | 43/21.2 |
| 6,505,431 B1 * | 1/2003 | Christian et al. | ................ | 43/21.2 |

FOREIGN PATENT DOCUMENTS

JP          5-153890       *  6/1993

* cited by examiner

*Primary Examiner*—David Parsley
(74) *Attorney, Agent, or Firm*—Paul J. Backden, Esq.; Niky E. Syrengclas, Esq.; Crockett & Crockett

(57) ABSTRACT

A dual fishing rod holder for engagement to a horizontal surface. The dual fishing rod holder has a first rod holder comprising an elongate cylinder with straps at one end for rotatably fastening a first fishing pole. The first rod holder contains a downward bend at a point on the rod holder. Additionally, a second fishing rod holder is connected to the first rod holder at a distance from the first rod holder. A first fishing pole is secured to an end of the first rod holder in a substantially downward position while a second fishing pole is secured by the second rod holder in substantially upright position. The first and second rod holders are positioned at a distance such that the fishing poles and their lines do not become entangled.

9 Claims, 1 Drawing Sheet

DUAL FISHING ROD HOLDER

FIELD OF THE INVENTIONS

The inventions described below relate to the field of fishing rod holders and reel straps.

BACKGROUND OF THE INVENTIONS

Fishing rod holders and reel straps have been used in fishing for many years. Many current devices allow a user to support a fishing rod during trolling, so that a fisherman need not tend a rod until a fish bites. Fishing rod holders can be supported in various positions on a boat, from a pier, or from some other horizontal surface. Some rod holders secure a fishing pole into a base support member. Other fishing rod holders are secured to the fishing pole by straps that are connected to the reel of the fishing pole. Though rod holders and reel straps have been used for many years, there has not been a device that combines these two features in order to allow for the use of two fishing poles from the same mount on a gunwale. This limitation has been overcome by the new device described below.

SUMMARY

The device and methods described below provide for the efficient holding of two fishing poles from a single mount. The device includes first and second fishing rod holders. The rod holders are disposed at an angle to each other, in the vertical plane, so that one fishing rod is held in a tip-down position and the other rod is held in a tip-up position. They may be aligned in the same vertical plane, or they may be offset. The first rod holder, which holds a rod in tip-down position, has straps at its distal end for releasable attachment of the reel of a first fishing pole thereto. The second rod holder, which holds a rod in a tip-up position, is a cylinder which accommodates the handle of the second fishing rod pole. The second rod holder is positioned at a distance above the first rod holder. Both rod holders are secured to a mounting post which may be inserted into a conventional rod holder or any suitable mount or base. On a boat, this a rod holder or mount on the gunwale serves a suitable base. The first rod holder can be of varying sizes to accommodate different locations on different boat types or different locations on a single boat. Use of the rod holder allows for deployment of twice as many fishing poles on the boat, which is beneficial for individual fishermen and for entities that provide fishing services and charge per person.

DETAILED DESCRIPTION OF THE INVENTIONS

Figure 1:
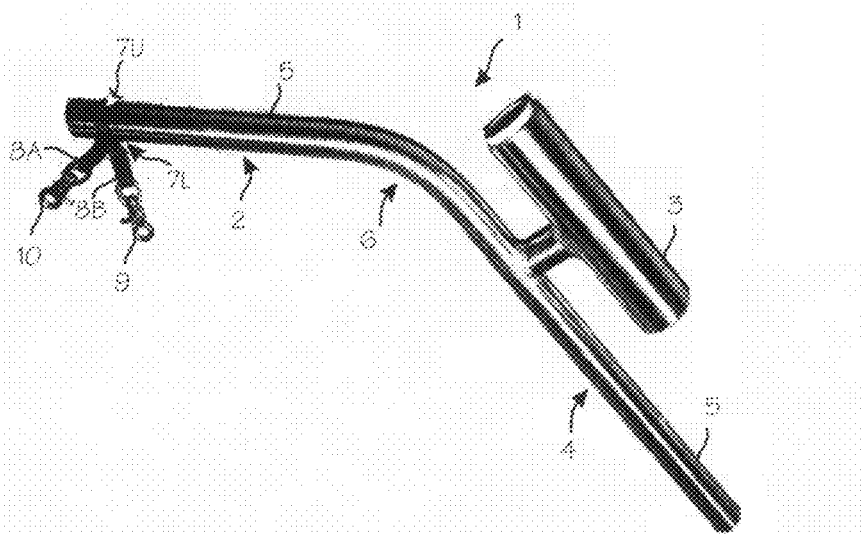
FIG. 1 illustrates the dual fishing rod holder.

FIG. 1 illustrates the dual fishing rod holder 1. The dual rod holder includes a first, tip-down rod holder 2 and a second, tip-up rod holder 3 connected to a single mounting post 4. The mounting post is sized and dimensioned to fit standard rod holders, such as may be installed in the gunwale of a small boat. The tip-down rod holder 2 is an elongate member with a "proximal" attached to the mounting post (that is, proximal relative to the fisherman, when in use) and a distal end. As shown, the mounting post and tip-down rod holder as conveniently made from a single tube 5 approximately 34" long and contains a bend 6 of between 45° to 60° near its midpoint. This bend is positioned approximately 20" from the distal end of rod holder (which is most suitable for rod holders mounted on the aft gunwale, as explained below in relation to FIG. 2). The tube is made of aluminum or stainless steel pipe that is 1" to 1-¼" in diameter. The diameter is sufficient for placement of the mounting post portion into standard fishing rod holders contained on the gunwales of a boat. Alternatively, the mounting post may be placed in any suitable receiver or support structure on the boat, and may adapted as necessary to fit receivers or mounting structures of various design. At the distal end of the tip-down rod holder are two straps 8A, 8B. The straps are attached through two ½" to ¾" diameter holes, holes 7U and 7L, contained on the rod holder. The straps are comprised of standard nylon or similar web strap material and contain marine quality clips 9, 10 at the ends that are not attached to the rod holder. The clips releasably attach through reel eyes located on the outside faces of a reel. Once a fishing pole is attached to the first rod holder, the tip of the fishing rod is oriented in a downward position such that the tip is facing the water.

The tip-up rod holder is positioned above the tip-down rod holder. This second rod holder is a stainless steel or aluminum tube. The second rod holder is fixedly contained on the first rod holder at a distance from the first rod holder. As illustrated, the second rod holder is mounted near the proximal end of tip-down rod holder, before the downward bend 6, but it may mounted in any manner such that it is positioned as shown, extending upwardly away from the tip-down holder at a significant angle. The second rod holder allows for a second fishing pole to be secured within the cylinder. Once the pole is positioned within the second rod holder and the entire device is contained within a horizontal surface, the second fishing pole stands substantially upright, facing towards the sky. This ensures that the two poles do not get tangled up nor do the fishing pole lines.

The rod holder bend 6 is oriented in a downward angle. This configuration ensures that when the first and second fishing rods are engaged, the rod in the first holder is positioned lower than the first rod so that fishing lines running from the two do not get entangled during normal trolling. Additionally, this first rod can be rotated in any direction because the rod is only constricted by the straps and not by any rigid or fixed structure. The configuration of the second rod holder allows the second pole to be positioned in a substantially upright position. This allows the line of the second pole to be trailed at a greater or farther distance so that the two lines do not get tangled up.

Figure 2:
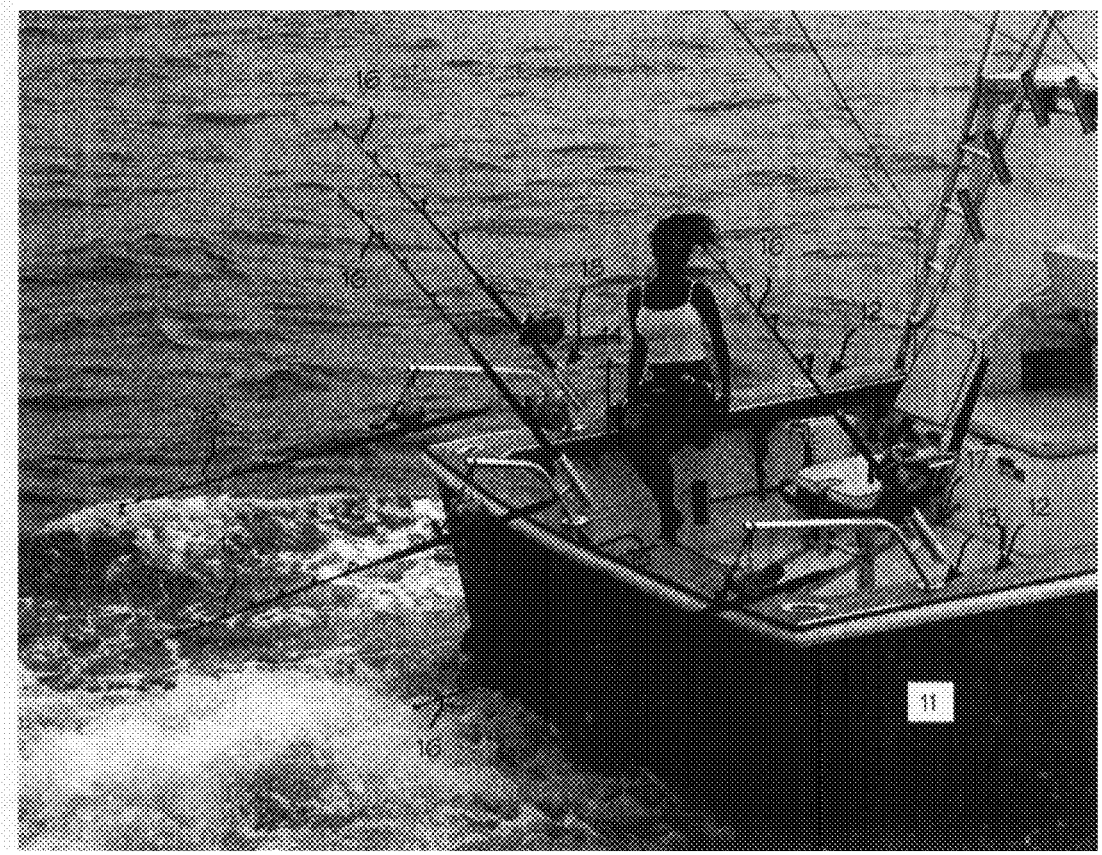
FIG. 2 illustrates the dual fishing rod holder with a longer tipped rod holder.

FIG. 2 illustrates use of the dual rod holder on a typical small fishing boat. The boat 11 includes a gunwale 12 with several pre-installed rod holders 13, 14 and 15 located on port, starboard and aft portions of the gunwale. The dual rod holders are installed with the mounting posts inserted into the pre-installed rod holders, with the tip-down and tip-up rod holders pointing aft, and fishing rods 16 secured in the holders. The tip down rod holder is held at a slight upward angle relative to the water, though the angle may vary significantly since the rod is suspended loosely from the tip-down holder. The tip-up holder is held at about a 45° angle from the water, and this angle may vary from about 30° to 90° so long as it is sufficient to hold the rip-up rod and its line clear of the tip-down rod and its line. In FIG. 2, dual rod holders 17 and 18 have tip-down rod holders 2 which are dimensioned differently to accommodate for alternative locations on various boat types or for different locations on a single boat. The configuration is identical to that described above except that the first rod holder is approximately 46" long. The bend 6 in the first rod member is positioned at approximately 25" from the proximal end of the first rod holder. This longer configuration allows an even greater distance to be created between the two secured fishing pole lines, and is suitable for use on the port and starboard gunwales where the fisherman can more readily access the distal end of the first rod holder. As illustrated, the dual rod holders enable a method of trolling which comprises use of several dual rod holders, with tip-down rod holders of differing length to suit the location on the boat, so that the number of line that may be set are doubled.

As shown in FIG. 2, when in use, the rod suspended form the tip-down rod holder is maintained substantially parallel to the water (or at a slight downward angle) by the drag of hook and tackle while the boat is trolling. At the same time, the rod held in the tip-up rod holder is held at a substantial upward angle from the water (about 45°, as illustrated, though the angle vary from about 30° to 90°). The line from the tip-down rod is set a relatively short distance, while the line from the tip-up rod is set at a relatively long distance, so that entanglement of the lines is improbable.

While the dual rod holder shown in constructed conveniently of aluminum tubes, with the tip-down rod holder formed integrally with the mounting post, any construction may be used to locate the two rod holders relative to each other as shown. The angles at which the components are held relative to each other may be varied to suit gunwale rod holders of varying design, rods of varying length, and differing trolling methods. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A dual fishing rod holder for insertion into a handle receiver on a boat comprising:
    a first tube having a first end and a second end, and a bend disposed between the first and the second ends, forming a first portion of said first tube on one side of the bend and a second portion of the first tube on the opposite side of the bend, the bend forming an obtuse angle between the first and second portions with the first portion oriented above the second portion, each of the first and second portions having an interior end adjacent to the bend and a terminal end opposite the interior end;
    a strap secured to the terminal end of the first portion of the first tube;
    two clips secured to the strap, each clip for engaging a reel eye of a first fishing reel to support a first fishing rod secured to the first fishing reel in a generally horizontal orientation relative to the boat;
    a second tube for engaging a handle of a second fishing rod and supporting a second fishing rod above the first fishing rod relative to the boat when both a first and a second fishing rods are supported by the dual fishing rod holder, the second tube attached to the second portion of the first tube via a support directly connected between the second tube and the second portion of the first tube, the support oriented perpendicular to the second tube and the second portion of the first tube, the second tube extending above and parallel with the second portion of the first tube.

2. The dual fishing rod holder of claim 1 wherein the strap is a cord.

3. The dual fishing rod holder of claim 1 further comprising:
    two straps secured to the terminal end of the first portion of the first tube;
    two clips, each clip secured to one of the two straps, each clip for engaging a reel eye of a first fishing reel to support a first fishing rod secured to the first fishing reel in a generally horizontal orientation relative to the boat.

4. The dual fishing rod holder of claim 3 wherein each strap is a cord.

5. A dual fishing rod holder for insertion into a handle receiver on a boat comprising:
    a first tube having a first end and a second end, and a bend disposed between the first and the second ends, forming a first portion of said first tube on one side of the bend and a second portion of the first tube on the opposite side of the bend, the bend forming an obtuse angle between the first and second portions with the first portion oriented above the second portion, each of the first and second portions having an interior end adjacent to the bend and a terminal end opposite the interior end, the terminal end of the first portion of the first tube including one or more holes for supporting a fishing reel;
    a strap secured to the one or more holes of the first portion of the first tube;
    two clips secured to the strap, each clip for engaging a reel eye of a first fishing reel to support a first fishing rod secured to the first fishing reel in a generally horizontal orientation relative to the boat;
    a second tube for engaging a handle of a second fishing rod and supporting a second fishing rod above the first fishing rod relative to the boat when both a first and a second fishing rods are supported by the dual fishing rod holder, the second tube attached to the second portion of the first tube via a support directly connected between the second tube and the second portion of the first tube, the support oriented perpendicular to the second tube and the second portion of the first tube, the second tube extending above and parallel with the second portion of the first tube.

6. The dual fishing rod holder of claim 5 wherein the strap is a cord.

7. The dual fishing rod holder of claim 5 further comprising:
    two straps secured to the one or more holes of the first portion of the first tube;
    two clips, each clip secured to one of the two straps, each clip for engaging a reel eye of a first fishing reel to support a first fishing rod secured to the first fishing reel in a generally horizontal orientation relative to the boat.

8. The dual fishing rod holder of claim 7 wherein each strap is a cord.

9. A dual fishing rod holder adapted to be inserted into a handle receiver on a boat comprising:
    a first tube having a first end and a second end, and a bend disposed between said first and second ends, forming a first portion of said first tube on one side of the bend and a second portion of the first tube on the opposite side of the bend, the bend forming an obtuse angle between said first and second portions so that said first portion being disposed above said second portion, each of said first and second portions having proximal ends disposed adjacent to said bend and distal ends disposed opposite said proximal ends;

a second tube attached to the second portion of the first tube via a support directly connected between said second tube and said second portion of said first tube, said support positioned perpendicular to said second tube and said second portion of said first tube, said second tube extending above and being parallel with said second portion of said first tube;

first and second straps attached directly to holes in the distal end of said first portion of said first tube, each of said straps extending downward from said first portion of said first tube, and each strap having a clip disposed thereon, each clip being adapted to engage a reel of a fishing rod;

wherein said first tube is adapted to hold a first fishing rod in a hanging configuration via said clips of said straps engaging a reel of said first rod, with said first rod being held in a generally horizontal position with respect to said boat; and wherein said second tube is adapted to hold a second fishing rod by holding a handle portion of said second rod inside said second tube in a generally vertical configuration with respect to said boat, so that said second rod extends above said first rod when both said first and second rods are supported by said fishing rod holder.

* * * * *